US006550597B2

(12) United States Patent
Taniguchi (10) Patent No.: US 6,550,597 B2
(45) Date of Patent: Apr. 22, 2003

(54) EMERGENCY BRAKE MECHANISM (75) Inventor: Naoya Taniguchi, Wakayama (JP)

(73) Assignee: Wakayama Nainenki Co., Ltd., Wakayama (JP)

( * ) Notice: Subject to any disclaimer, the term of this patent is extended or adjusted under 35 U.S.C. 154(b) by 0 days.

(21) Appl. No.: 09/950,077

(22) Filed: Sep. 12, 2001

(65) Prior Publication Data

US 2002/0046815 A1 Apr. 25, 2002

(51) Int. Cl.[7] .......................... E05F 15/20; B60K 41/26
(52) U.S. Cl. ............................ 192/215; 192/147; 160/8; 160/296
(58) Field of Search .................... 192/147, 215; 188/189, 180, 184; 160/8, 296

(56) References Cited

U.S. PATENT DOCUMENTS

| | | | | | |
|---|---|---|---|---|---|
| 4,416,430 A | * | 11/1983 | Totten | ................... | 182/237 |
| 4,538,703 A | * | 9/1985 | Ellis et al. | ................... | 182/10 |
| 4,986,390 A | * | 1/1991 | Kikuchi | ................... | 182/234 |
| 5,355,927 A | * | 10/1994 | McKeon | ................... | 160/133 |

* cited by examiner

Primary Examiner—Saul Rodriguez
(74) Attorney, Agent, or Firm—Wenderoth, Lind & Ponack, L.L.P.

(57) ABSTRACT

In an emergency brake mechanism of the present invention, a rotation input shaft is increased in rotation speed by a planetary set-up gear to centrifuge weights. Through the action of the centrifugal force of the weights, linings of the brake shoes are brought into press-contact with a fixed portion to reduce rotation of the rotation input shaft, such that a large braking power is produced for a compact emergency brake mechanism.

12 Claims, 8 Drawing Sheets

EMERGENCY BRAKE MECHANISM

BACKGROUND OF THE INVENTION

1. Technical Field of the Invention

The present invention relates to an emergency brake mechanism and, particularly, to a centrifugal emergency brake mechanism.

2. Description of the Prior Art

In a generally known centrifugal emergency brake mechanism, brake shoes are pivotally supported to a rotation axis at one end thereof, so that when the rotation axis is rotated, the brake shoes are centrifuged and swung outward. Thus, part of the spread-out brake shoes are brought into press-contact with a fixed surface, so as to apply friction to the rotation axis and apply braking force.

In this conventional centrifugal emergency brake mechanism, since the frictional force for the brake is generated by the centrifugal force generated by the mass of the brake shoes rotated, generation of a strong frictional force requires an increase in the mass of the brake shoes or in the rotation speed of the brake shoes.

When an increased frictional force is produced by increasing the mass of the brake shoes, there arises a problem in that the brake shoes and thus the entire emergency brake mechanism are increased in size. As a result, the brake shoes are not suitable for installation on a compact brake mechanism.

On the other hand, when an increased centrifugal force is produced by increasing the rotation speed of the brake shoes, there arises a problem in that it is practically infeasible to mount the emergency brake mechanism on a rotation axis having a relatively low revolution (rotation speed), such as the rotation axis of a shutter used in a factory, warehouse and the like, or a rope winding shaft of a lift and the like on and from which an escape rope is wound and paid out.

If a heavyweight shutter is used for a factory or warehouse and is pulled down, the rotation axis gradually increases in rotation speed as the shutter paid out increases in length and in downward inertia force. As a result of this, when the bottom end of the shutter gets down to the ground, a large impact and noises are produced, and also one's fingers or toes might be caught in or pinched between the shutter and the ground and injured or cut off. In an escape lift having a gondola, for example, if the rotation axis of the escape lift gradually increases in rotation speed, the gondola is put in danger when landed.

In the light of the problems above, the present invention has been proposed. It is the object of the present invention to provide a centrifugal emergency brake mechanism having a compact size that is applicable to a variety of devices and can produce an excellent braking power for the compact size.

SUMMARY OF THE INVENTION

In order to accomplish the object mentioned above, an emergency brake mechanism according to the present invention comprises a planetary set-up mechanism provided between a rotation input shaft and a fixed portion; weights; and brake shoes. The brake shoes are arranged on the rotation input shaft so as to be in association with it, and the weights are centrifuged by an increased rotation speed produced by the planetary set-up gear. Through the action of the centrifugal force of the weights, friction surfaces of the brake shoes are brought into press-contact with the fixed portion, to reduce rotation of the rotation input shaft.

In the emergency brake mechanism mentioned above, frictional contact portions are formed in the brake shoes at portions thereof on the drive shaft side, so as to directly or indirectly contact the drive shaft. In addition, the portions of the brake shoes with which the frictional contact are brought into contact are formed as slant locking surfaces.

In the emergency brake mechanism mentioned above, the rotation input shaft may be shaft of a shutter and may be structured so as to control a lowering speed of the shutter.

DETAILED DESCRIPTION OF THE INVENTION

In the following, a description will be given of the preferred embodiments of the emergency brake mechanism according to the present invention with reference to the accompanying drawings.

Figure 1:
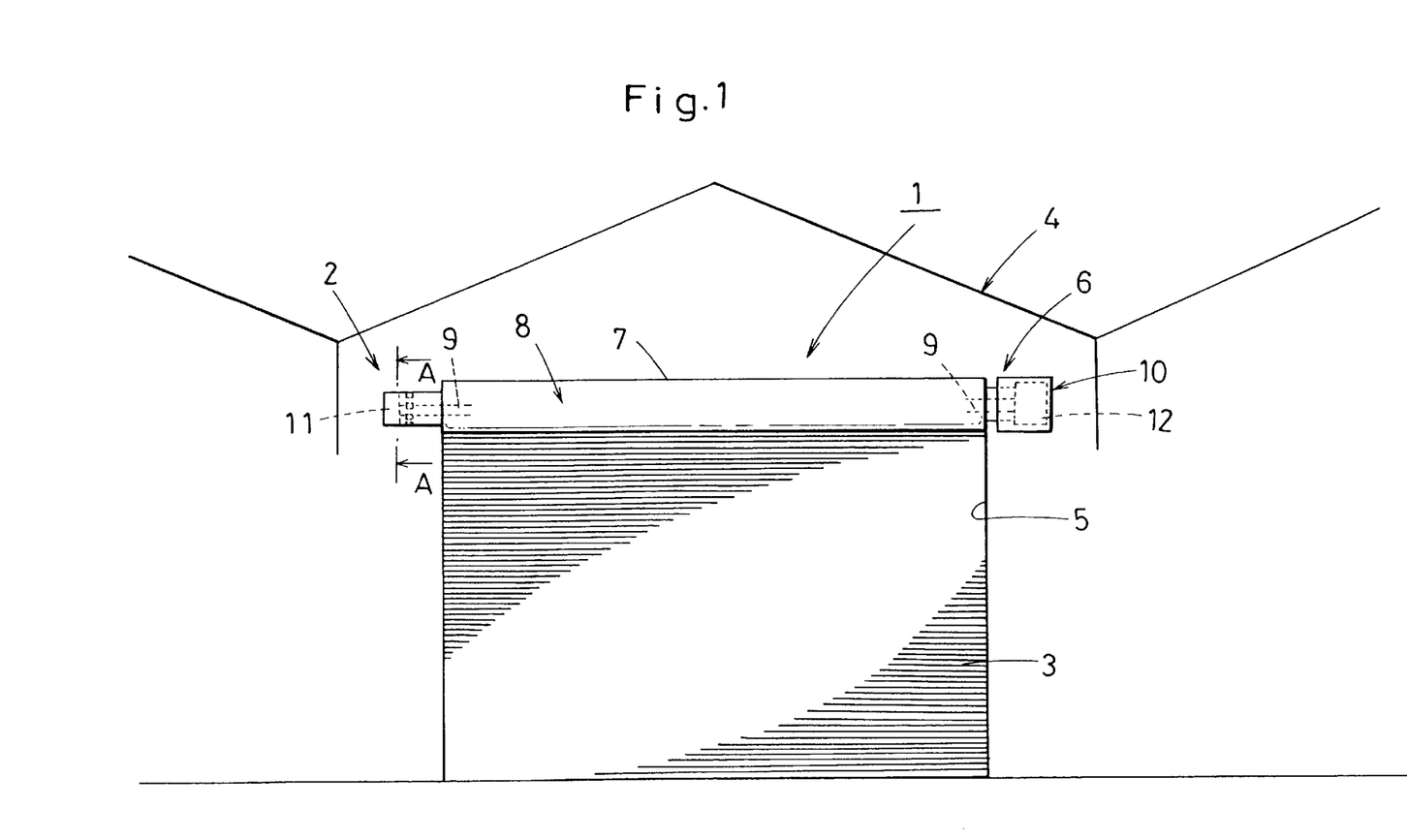
FIG. 1 is a front view in outline of an emergency brake mechanism according to the present invention mounted on a shutter at an entrance of a warehouse.
Figure 2:
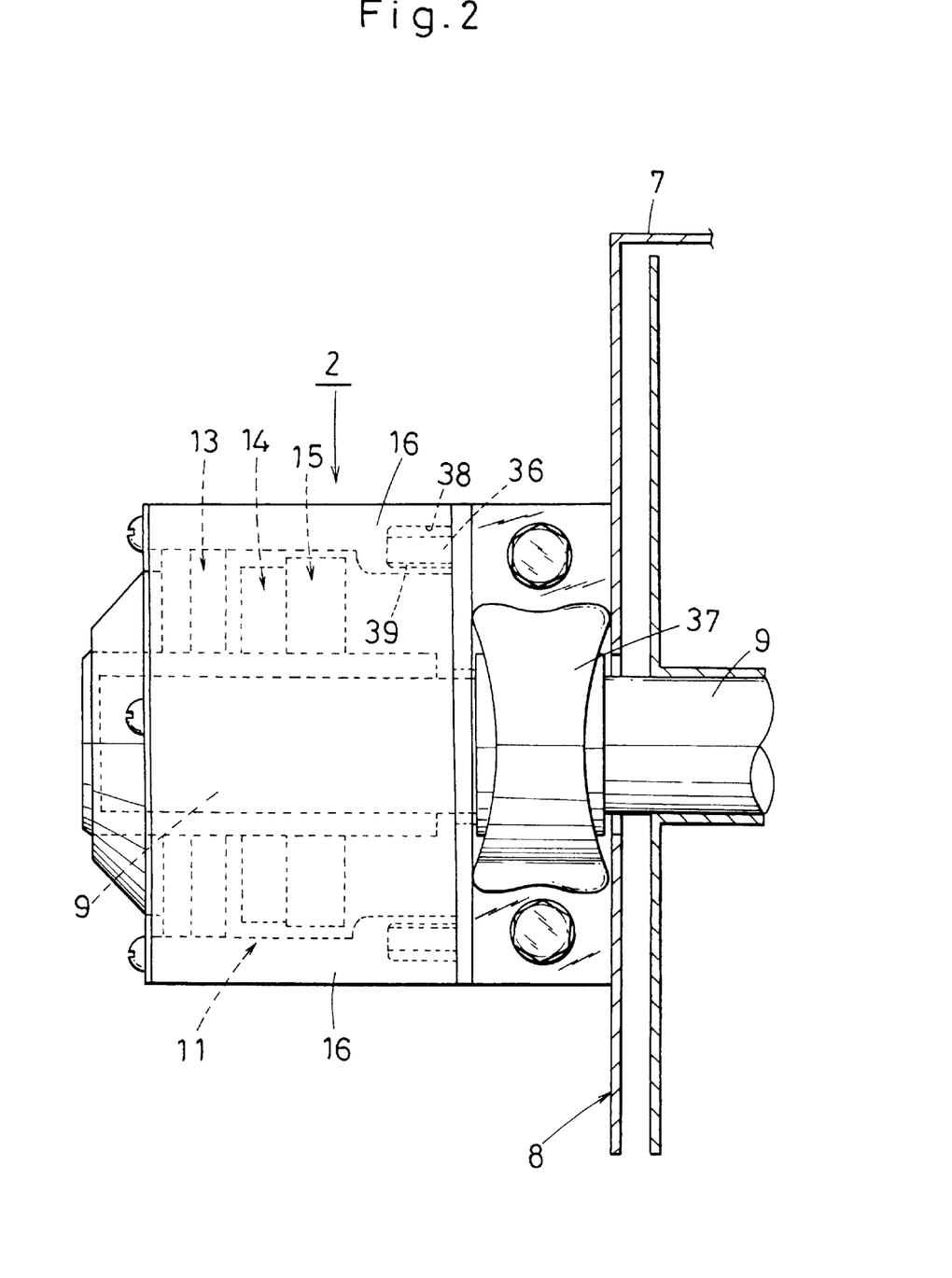
FIG. 2 is an enlarged view of an emergency brake mechanism portion according to the present invention.

FIG. 1 is a front view of an emergency brake mechanism of the present invention mounted on a shutter attached to a factory or warehouse. FIG. 2 is an enlarged view of an emergency brake mechanism portion according to the present invention, and FIG. 3 is an enlarged longitudinal section of the emergency brake mechanism portion.

In the drawings, reference numeral 1 denotes the entirety of the shutter with an emergency brake mechanism 2. The shutter 1 has a blade portion 3 for covering an entrance 5 of a warehouse 4. The blade portion 3 is configured to be retractably taken up by a winding mechanism 6 provided at the top of the entrance 5 of the warehouse 4. The winding mechanism 6 includes an accommodating portion 8 covered with a cover 7, a drive shaft (rotation input shaft) 9 extending through the accommodating portion 8, a drive unit 10 provided at a first end of the drive shaft 9, and a brake unit 11 provided at the other (second) end of the drive shaft 9. A take-up reel (not shown) is mounted on the drive shaft 9 extending through the accommodating portion 8, and an upper end portion of the blade portion 3 is connected to the take-up reel.

The drive unit 10 provided at the first end of the drive shaft 9 includes an electric motor 12, a reduction gear mechanism (not shown) for reducing the rotation speed of the electric motor 12, and a chain drive mechanism (not shown) for transmitting the reduced rotation to the drive shaft 9.

Figure 3:
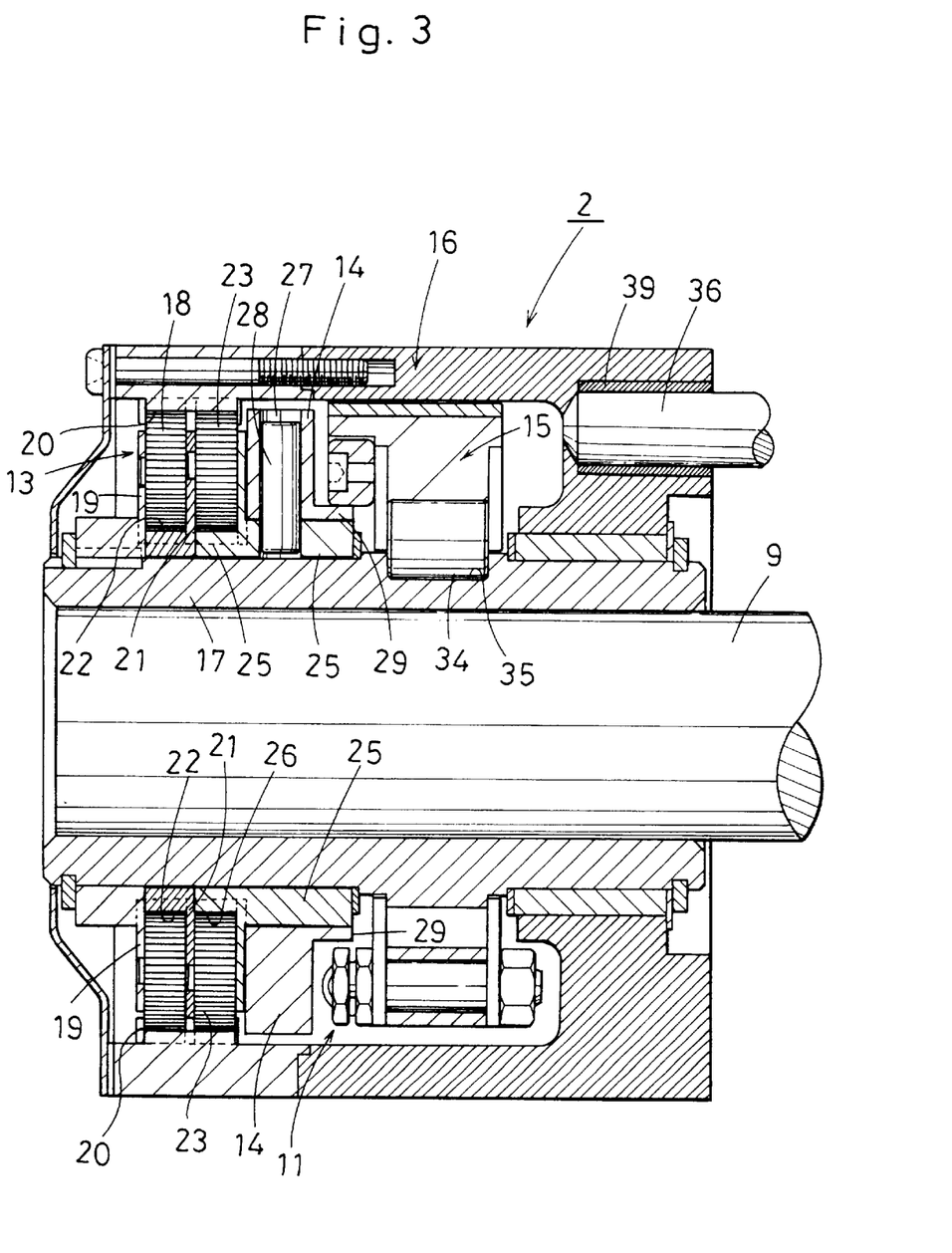
FIG. 3 is an enlarged longitudinal section of the emergency brake mechanism portion according to the present invention.

The brake unit 11 provided at the second end of the drive shaft 9 includes a planetary set-up gear mechanism 13 for increasing the rotation speed of the drive shaft (rotation input shaft) 9, a tubular casing (a fixed portion) 16 rotationally driven in association with the drive shaft 9, weights 14 rotationally driven at an increased speed by the planetary set-up gear mechanism 13, and brake shoes 15 for braking the rotation of the drive shaft 9 through the action of the centrifugal force of the weights 14 (See FIGS. 2 and 3).

Figure 4:
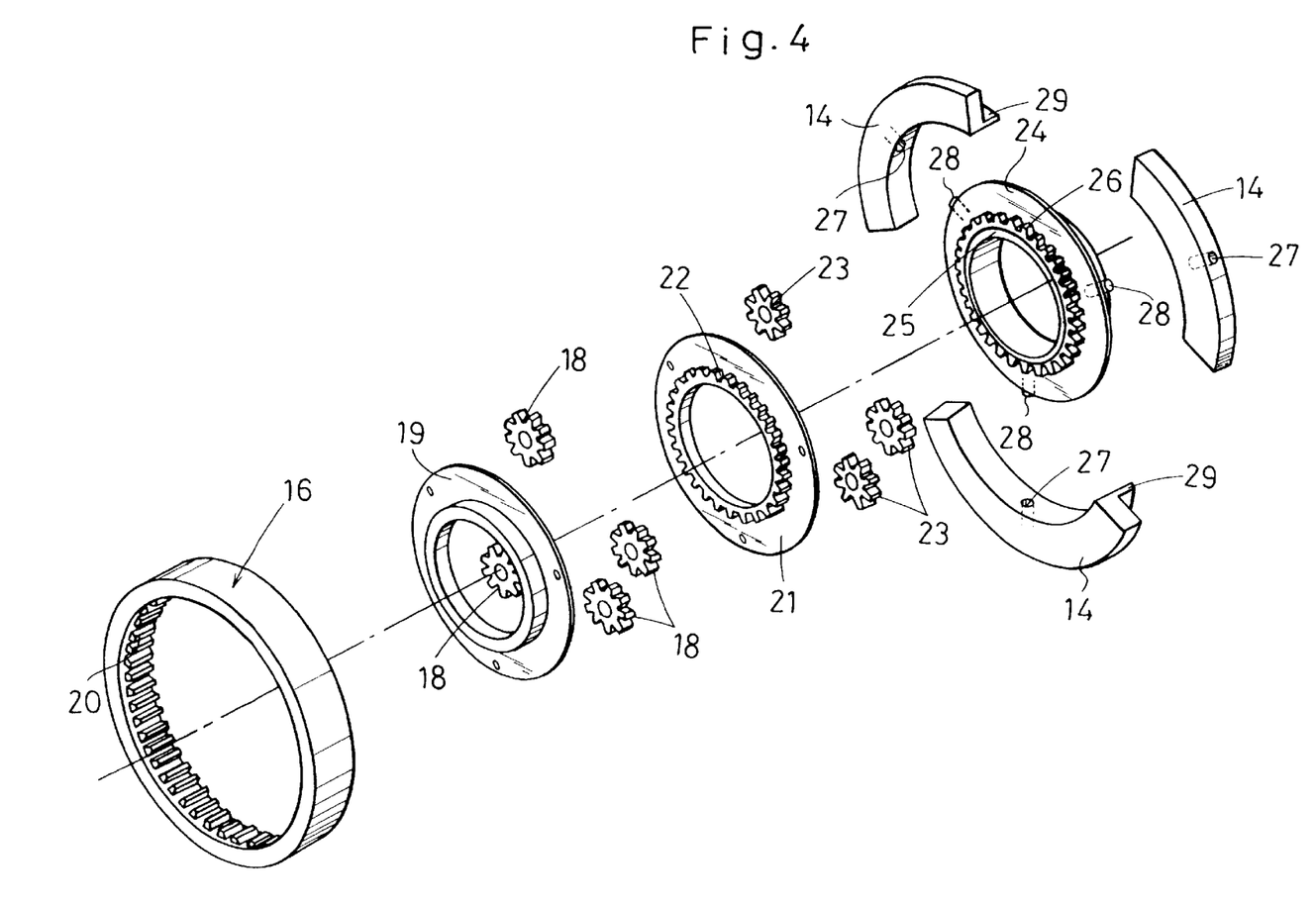
FIG. 4 is an exploded perspective view of a planetary set-up gear portion of the emergency brake mechanism according to the present invention.

In the planetary set-up gear mechanism 13, a rotary sleeve 17 is fitted to an end portion of the drive shaft 9 in the tubular casing (a fixed portion) 16 so as to be rotated together with the drive shaft 9. A first pivot plate 19, by which a plurality of first planetary gears 18 are pivotally supported, is fixedly mounted on a distal end of the rotary sleeve 17 (at the left end as viewed in the diagram), as shown in FIGS. 3 and 4.

The plurality of first planetary gears 18 are engaged between an internal gear 20 formed around an inside surface of the casing 16 and a first external gear 22 formed around a periphery of a tubular portion of a second pivot plate 21 rotatably fitted onto the rotary sleeve 17. The internal gear 20 has a larger number of teeth than the first external gear 22. Accordingly, when the first pivot plate 19 is rotated 360 degree, the second pivot plate 21 is rotated at an accelerated speed to the extent corresponding to a ratio of the number of teeth of the internal gear 20 to the number of teeth of the first external gear 22.

Likewise, a plurality of second planetary gears 23 are pivotally supported by the second pivot plate 21. The plurality of second planetary gears 23 are engaged between the internal gear 20 formed around the inside surface of the casing 16 and a second external gear 26 formed around a periphery of a tubular portion 25 of a weight supporting plate 24 (mentioned later) rotatably fitted onto the rotary sleeve 17. The internal gear 20 has a larger number of teeth than the second external gear 26. Accordingly, when the second pivot plate 21 is rotated 360 degree, the tubular portion 25 of the weight supporting plate 24 is rotated at an accelerated speed corresponding to a ratio of the number of teeth of the internal gear 20 to the number of teeth of the second external gear 26.

As a result of this, the speed ratio between the drive shaft 9 and the tubular portion 25 of the weight supporting plate 24 is the ratio of the number of teeth of the internal gear 20 to the number of teeth of the external gear 22 multiplied by the ratio of the number of teeth of the internal gear 20 to the number of teeth of the external gear 26. For example, when the number of teeth of the internal gear 20 is set to be 90 and the number of teeth of the first external gear 22 and second external gear 26 are set to be 45, respectively, the speed ratio=90/45×90/45=4, so that the rotation of the tubular portion 25 of the weight supporting plate 24 is speeded up four times as fast as the rotation of the drive shaft 9.

The weight supporting plate 24 has a flanged portion formed to project outwardly (radially) from a nearly center position of the tubular portion 25 that is fitted onto the rotary sleeve 17 so as to be rotatable relative thereto. The weight supporting plate 24 has the second external gear 26 formed around the periphery of the tubular portion 25 at a left side thereof with respect to the flanged portion. The weights 14 are held on the tubular portion 25 of the weight supporting plate 24 at a right side thereof with respect to the flanged portion, so as to be slidable in a radial direction due to centrifugal force.

Specifically, the weights 14 are formed by three separate heavy objects formed by splitting a heavy object substantially equally into three pieces extending along a circular arc, and the weights are mounted around the periphery of the weight supporting plate 24, as shown in FIG. 4. The three weights 14 have, at substantially center portions thereof, supporting through-holes 27 in which three supporting rods 28 extending from the tubular portion 25 of the weight supporting plate 24 at the right side thereof are inserted to support the weights 14.

Each of the weights 14 has a controlling portion 29 to control the expansion of the brake shoe 15, and each controlling portion 29 is formed to project out horizontally toward the brake shoe 15 along the tubular portion 25, as shown in FIG. 3.

Figure 5:
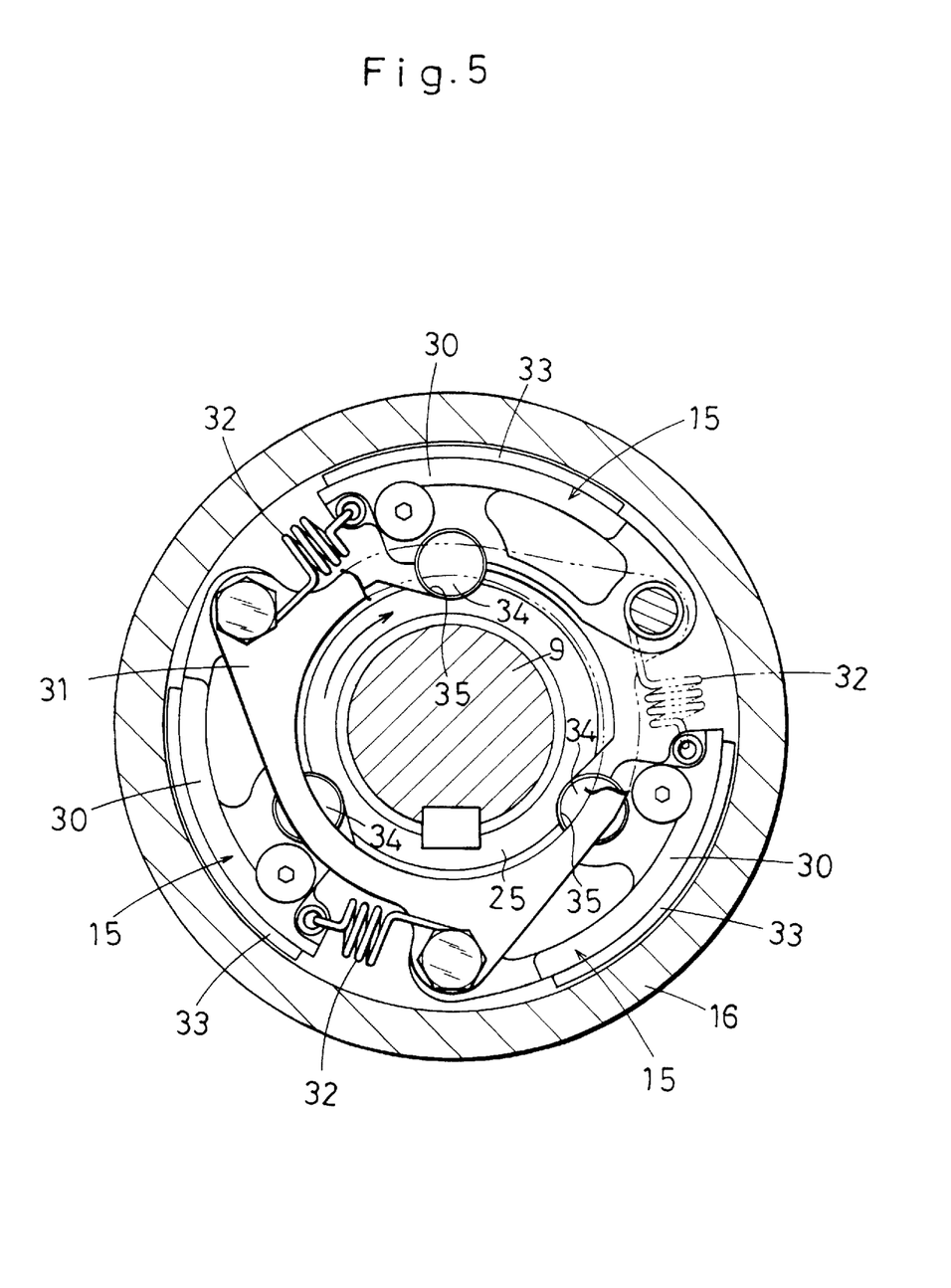
FIG. 5 is a longitudinally sectioned side view of the emergency brake mechanism according to the present invention.

As shown in FIGS. 3 and 5, the brake shoes 15 are formed by three separate shoe members 30 extending along a circular arc and spaced at regular intervals, and side plates 31, 31 are arranged at both sides of each shoe member 30. Each of the shoe members 30 is pivotally supported by the side plates 31, 31 at a first end thereof, and is connected to the adjoining side plates 31, 31 through a tension spring 32 at the other (second) end thereof so that it can be elastically biased in a direction for the brake shoe 15 to be contracted in outer diameter by tensile force of the tension spring 32.

Each shoe member 30 has a lining 33 (a frictional surface) at an outermost portion thereof, and has a contact member for holding each shoe member 30 at a predetermined peripheral location of the rotation input shaft. Each contact member includes a short cylindrical roller 34 (a frictional contact portion) at an inner portion thereof and slant locking surfaces. The rollers 34 are normally in press-contact with the slant locking surfaces 35 formed in the surface of the rotary sleeve 17 by the tensile force of the tension springs 32, respectively.

Figure 6:
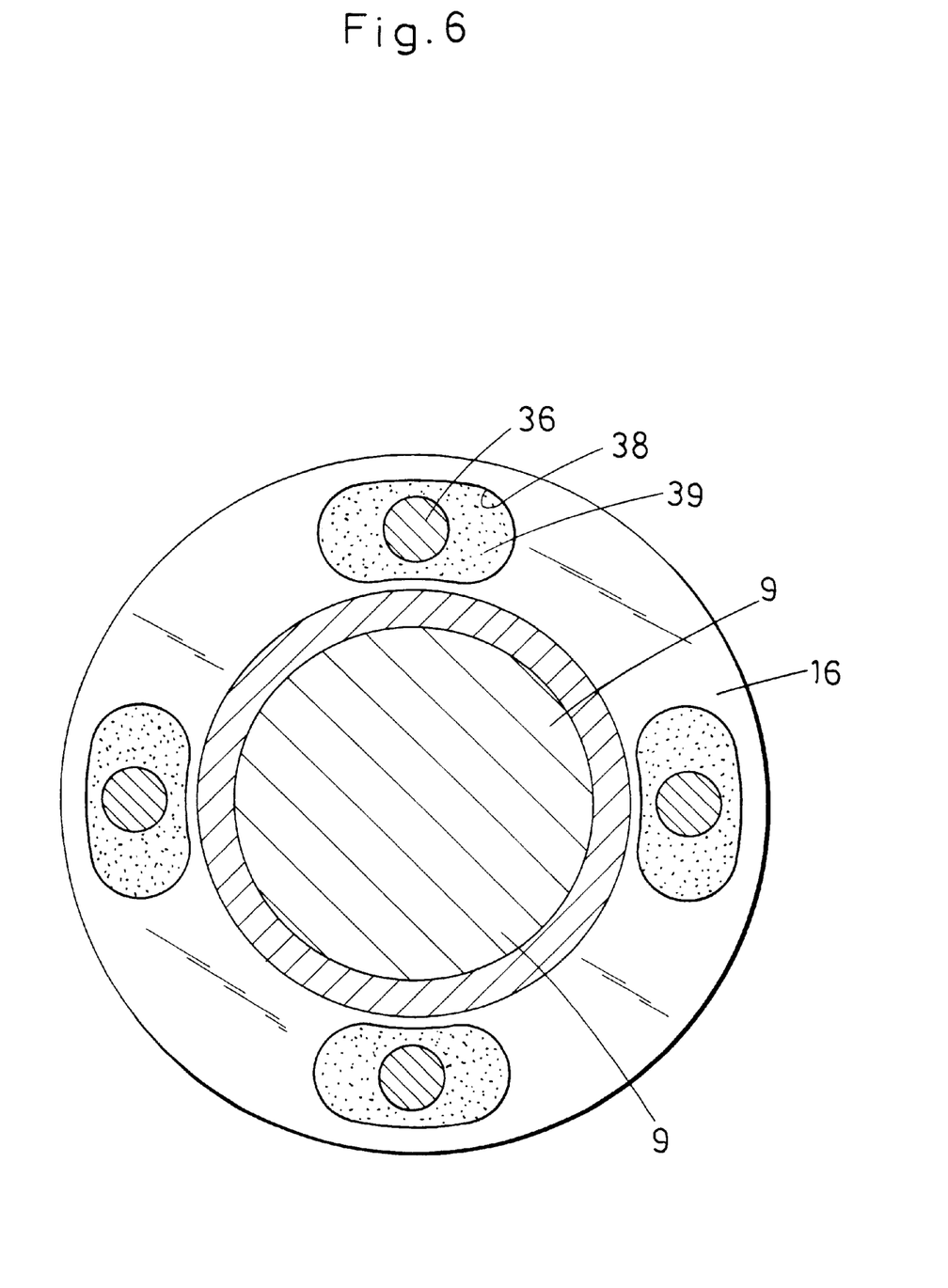
FIG. 6 is a sectional view taken along line A—A of FIG. 1.

Reference numeral 36 in FIG. 3 denotes securing pins for securing the tubular casing 16. The pins 36 project from a base portion of a bearing 37 for rotatably supporting an end of the drive shaft 9, and are inserted in fitting holes 38 bored in a side surface of the tubular casing 16. The fitting holes 38 are formed into elongated form or in the form of slots, as shown in FIG. 6, and cushioning material 39 of silicone gum and the like is packed around the pins 37 in the slots 38. The cushioning material 39 is omissible if a large torque is to be exerted on it.

Now, operation of the emergency brake mechanism 1 of the present invention thus formed will be described below.

When the entrance 5 of the warehouse 4 is covered with the blade portion 3 of the shutter retracted in the winding mechanism 6 provided at the top of the entrance 5 of the warehouse 4, the electric motor 12 of the drive unit 10 is driven first and then is reduced in rotation speed to drive the take-up reel through the drive shaft 9, so as to pay out the blade portion 3.

As the blade portion 3 of the shutter 1 is gradually paid out, the entrance 5 of the warehouse 4 is gradually covered with the blade portion 3 of the shutter 1. Simultaneously, the opposite torque resulting from the weight of the blade portion 3 acting on the drive shaft 9 is gradually increased, and the rotation speed of the drive shaft 9 is gradually increased.

Along with the increase in rotation speed of the drive shaft 9, the rotation speed of the rotary sleeve 17 of the brake unit 11 of the emergency brake mechanism 1 arranged at the end of the drive shaft 9 is also increased. The speed of rotary sleeve 17 is further accelerated by the planetary set-up gear 13, to rotate the weights 14 at a high speed.

When the rotation speed of the drive shaft exceeds a predetermined lowering speed, the weights 14 which are centrifuged and accelerated in rotation are forced to move toward the inside surface of the casing 16 by the centrifugal force, whereby the controlling portions 29 of the weights 14 are operated to expand the brake shoes 15 outward. The control force of the centrifuged weights 14 to expand the brake shoes 15 forces the brake shoes 15 to move outward against the spring force of the torsion spring 32, so as to bring the linings 33 into frictional contact with the inside surface of the casing 16, so as to reduce the rotation speed of the drive shaft 9 due to the friction force.

Figure 7:
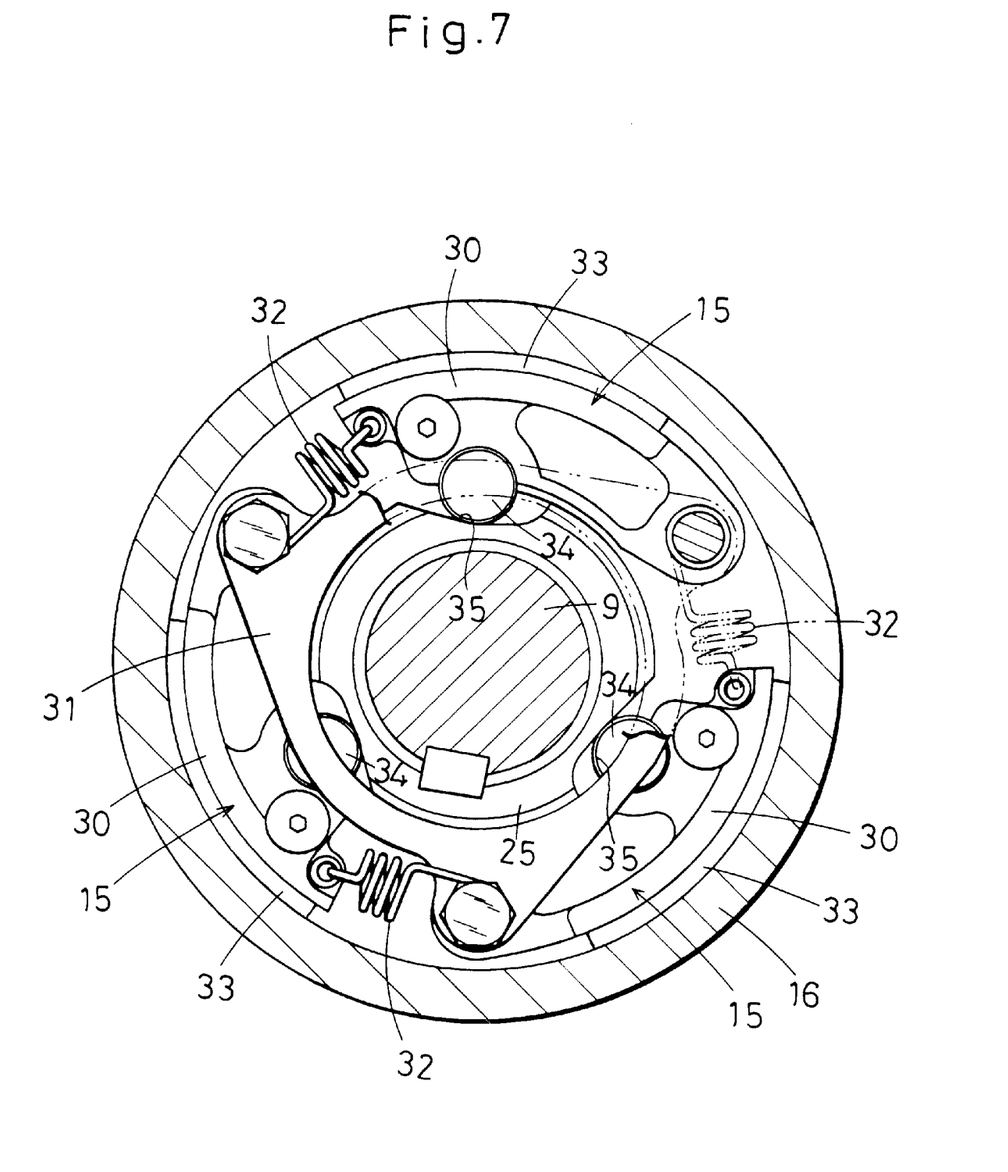
FIG. 7 is a longitudinally sectioned side view of the emergency brake mechanism according to the present invention which is in the operation mode.

When the rollers 34 of the shoe members 30 rides up on the slant locking surfaces 35 formed in the surface of the rotary sleeve 17 due to the centrifugal force, as shown in FIG. 7, the drive shaft 9 is put into a locked position in which the rotation of the drive shaft 9 is locked to bring the lowering of the blade portion 3 of the shutter 1 to a halt.

When the rotation of the drive shaft 9 is slowed down and halted by the friction force applied by the linings 33 and the locking force applied by the lock mechanism (including rollers 34 and the slant locking surface 35), the centrifugal force of the weights 14 is reduced, so that the brake shoes 15 are returned back to the original position by the spring force of the torsion springs 32. These motions are repeated, so that the rotation speed of the drive shaft 9 is controlled within a predetermined rotation speed range.

Figure 8:
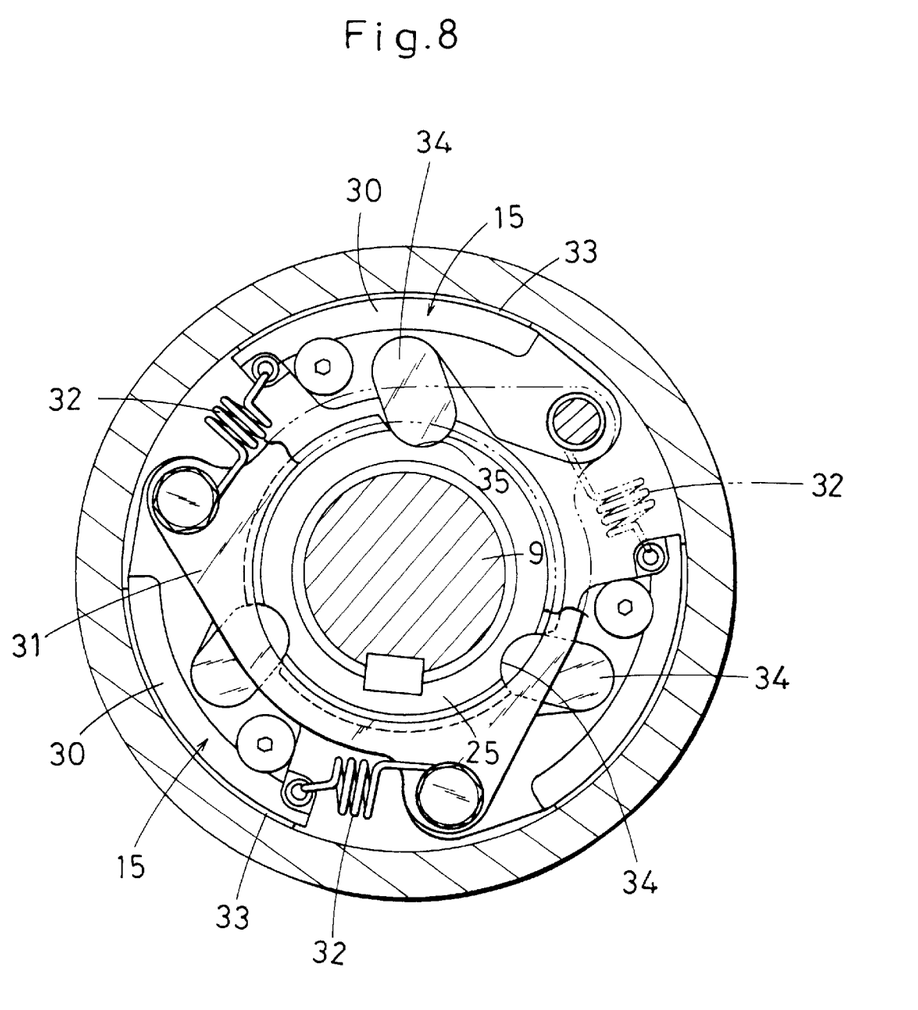
FIG. 8 is a longitudinally sectioned side view of a variant of a lock mechanism of the emergency brake mechanism according to the present invention which is in the operation mode.

The embodiment illustrated above has a structure wherein the short cylindrical rollers 34 (frictional contacting portions) are provided at the inner portion of the shoe members 30 and are put in press-contact with the slant locking surfaces 35 formed in the surface of the rotary sleeve 17 by the tensile force of the tension springs 32, respectively, within the predetermined rotation speed range. However, the present invention may be modified by providing an alternate contact member. For example, the rollers 34 can be replaced with oval brace members 34, and the slant locking surfaces 35 formed in the surface of the rotary sleeve 17 can be replaced with concaves 35 for supporting the bottom ends of the oval brace members 34, so that the brace members 34 can be put in the standing position to strongly halt the drive shaft 9, as shown in FIG. 8.

Also, the brake mechanism 1 of present invention is applicable not only for an emergency brake mechanism to be used with a shutter covering the entrance of the warehouse as illustrated above, but also for a speed regulation mechanism of an elevator, a battery car for a physically disabled person and an emergency man lift.

As mentioned above, the emergency brake mechanism of the present invention is structured so that the rotation input shaft is increased in rotation speed by the planetary set-up gear to centrifuge the weights. Therefore, through the action of the centrifugal force of the weights, the linings of the brake shoes are brought into press-contact with the fixed casing portion to reduce the rotation of the rotation input shaft. As a result, a large braking power can be produced for a compact emergency brake mechanism.

Thus, the emergency brake mechanism of the present invention can be mounted to a rotation axis having a low rotation speed, such as the rotation axis of the shutter of a factory or warehouse and a rope winding shaft of an emergency lift. For example, when the emergency brake mechanism of the present invention is applied to the shutter and the shutter is pulled down, the rotation axis can be prevented from being rotated at an increased rotation speed resulting from its own weight and the downward inertia force, as opposed to the prior art. This can provide the advantage that when the bottom end of the shutter gets down to the ground, generation of a large impact and noises can be prevented, and one's fingers or toes can be prevented from being caught in or pinched between the shutter and the ground and injured or cut off When the emergency brake mechanism of the present invention is applied to an escape lift with a gondola, the lowering speed of the gondola can be made stable, thus providing the advantage of providing an improved stability for the escape lift with a gondola.

What is claimed is:

1. An emergency brake mechanism comprising:
   a rotation input shaft for rotating at a first rotational speed;
   a fixed portion;
   weights operable to slide in a radial direction with respect to said rotation input shaft;
   a planetary gear mechanism arranged between said rotation input shaft and said fixed portion, said planetary gear mechanism being operable:
     to receive the first rotational speed from said rotation input shaft;
     to convert the first rotational speed to a second rotational speed greater than the first rotational speed; and
     to transmit the second rotational speed to said weights so as to centrifuge said weights; and
   a plurality of brake shoes, each of said brake shoes including a friction surface and a contact member, said contact member of each of said brake shoes being located at a predetermined circumferential location of said rotation input shaft so as to connect each of said brake shoes with said rotation input shaft, wherein said weights are engaged with said brake shoes such that said weights are operable to lift said brake shoes in a radial direction with respect to said rotation input shaft so as to press said friction surface of each of said brake shoes against said fixed portion when the second rotational speed exceeds a predetermined speed, thereby reducing the first rotational speed of said rotation input shaft.

2. The emergency brake mechanism of claim 1, wherein said rotation input shaft has a rotary sleeve attached thereto, said contact member of each of said brake shoes including a slant locking surface section formed in said rotary sleeve and a short cylindrical roller operable to ride along said slant locking surface section when said weights lift said brake shoes.

3. The emergency brake mechanism of claim 1, wherein said rotation input shaft has a rotary sleeve attached thereto, said contact member of each of said brake shoes including a concave surface section formed in said rotary sleeve and an oval brace member having an end supported in said concave surface section and being operable to rotate.

4. The emergency brake mechanism of claim 1, wherein each of said brake shoes further includes a pair of side plates, each of said side plates having a pivotally-supported first end, and having a second end connected to a first end of a circumferentially-adjacent side plate by a spring.

5. The emergency brake mechanism of claim 4, wherein said rotation input shaft has a rotary sleeve attached thereto, said contact member of each of said brake shoes including a slant locking surface section formed in said rotary sleeve and a short cylindrical roller connected to said pair of side plates and operable to ride along said slant locking surface section when said weights lift said brake shoes.

6. The emergency brake mechanism of claim 4, wherein said rotation input shaft has a rotary sleeve attached thereto, said contact member of each of said brake shoes including a concave surface section formed in said rotary sleeve and an oval brace member pivotally connected to said pair of side plates and having an end supported in said concave surface section.

7. A shutter comprising:
   a blade portion;
   a winding shaft connected to said blade portion and operable to rotate at a first rotational speed so as to wind said blade portion about said winding shaft;
   a fixed portion;
   weights operable to slide in a radial direction with respect to said winding shaft;
   a planetary gear mechanism arranged between said winding shaft and said fixed portion, said planetary gear mechanism being operable:
      to receive the first rotational speed from said winding shaft;
      to convert the first rotational speed to a second rotational speed greater than the first rotational speed; and
      to transmit the second rotational speed to said weights so as to centrifuge said weights; and
   a plurality of brake shoes, each of said brake shoes including a friction surface and a contact member, said contact member of each of said brake shoes being located at a predetermined circumferential location of said winding shaft so as to connect each of said brake shoes with said winding shaft, wherein said weights are engaged with said brake shoes such that said weights are operable to lift said brake shoes in a radial direction with respect to said winding shaft so as to press said friction surface of each of said brake shoes against said fixed portion when the second rotational speed exceeds a predetermined speed, thereby reducing the first rotational speed of said winding shaft.

8. The emergency brake mechanism of claim 7, wherein said winding shaft has a rotary sleeve attached thereto, said contact member of each of said brake shoes including a slant locking surface section formed in said rotary sleeve and a short cylindrical roller operable to ride along said slant locking surface section when said weights lift said brake shoes.

9. The emergency brake mechanism of claim 7, wherein said winding shaft has a rotary sleeve attached thereto, said contact member of each of said brake shoes including a concave surface section formed in said rotary sleeve and an oval brace member having an end supported in said concave surface section and being operable to rotate.

10. The emergency brake mechanism of claim 7, wherein each of said brake shoes further includes a pair of side plates, each of said side plates having a pivotally-supported first end, and having a second end connected to a first end of a circumferentially-adjacent side plate by a spring.

11. The emergency brake mechanism of claim 10, wherein said winding shaft has a rotary sleeve attached thereto, said contact member of each of said brake shoes including a slant locking surface section formed in said rotary sleeve and a short cylindrical roller connected to said pair of side plates and operable to ride along said slant locking surface section when said weights lift said brake shoes.

12. The emergency brake mechanism of claim 10, wherein said winding shaft has a rotary sleeve attached thereto, said contact member of each of said brake shoes including a concave surface section formed in said rotary sleeve and an oval brace member pivotally connected to said pair of side plates and having an end supported in said concave surface section.

* * * * *